United States Patent [19]
Lawson

[11] 3,801,191
[45] Apr. 2, 1974

[54] TAPE AND FILM EDITING MEANS
[75] Inventor: Peter Lawson, Romsey, England
[73] Assignee: Optasound Corporation, New York, N.Y.
[22] Filed: Mar. 15, 1971
[21] Appl. No.: 124,043

[52] U.S. Cl. .................................... 352/12, 352/33
[51] Int. Cl. ........................................... G03b 31/00
[58] Field of Search ............. 352/12, 13, 25, 31, 33, 352/129, 29

[56] References Cited
UNITED STATES PATENTS
| | | | |
|---|---|---|---|
| 2,813,453 | 11/1957 | Browder | 352/13 |
| 3,240,329 | 3/1966 | Custin | 352/12 X |
| 2,729,454 | 1/1956 | Vides | 352/29 X |
| 3,187,626 | 6/1965 | Mindell et al. | 352/25 X |

FOREIGN PATENTS OR APPLICATIONS
| | | | |
|---|---|---|---|
| 1,423,091 | 11/1965 | France | 352/31 |

Primary Examiner—Richard L. Moses
Attorney, Agent, or Firm—Ryder, McAulay, Fields, Fisher & Goldstein

[57] ABSTRACT

A system for advancing tape over a playback head and producing the sound thereon in synchronization with the advancing of the frames on a film having the corresponding subject matter thereon through a projection system. The playback head is arranged so as to be movable relative to the tape as the tape is being directed thereover. A tape feeding means and tape takeup means are provided as well as a film advancing means and a film takeup means. Means is provided for moving the tape and film so that as the sound on the tape is produced the corresponding visual subject matter on the film is shown. If the sound produced from the tape is out of synchronization with the visual image from the film the playback head can be moved until the synchronization is restored.

2 Claims, 6 Drawing Figures

TAPE AND FILM EDITING MEANS

BACKGROUND OF THE INVENTION

1. Field of the Invention

Tape and film editing means

2. Description of the Prior Art

Recently there has been a great deal of interest by amateur movie makers in making sound films. Traditionally, this was done by having a sound track located on the film in a manner so that the sound produced would at any instant of time correspond to the film frames then being projected. However, this was extremely expensive and financially out of the reach of most amateur movie makers.

Another prior art approach to making sound films was to record sound on a tape that was run in synchronization with a film upon which the visual subject matter for the tape was recorded. The problem with this technique was that it is very difficult to maintain synchronization between the tape and the film as the sound was being recorded on the tape and the corresponding subject matter was recorded on the film and this was particularly true if there were repeated stops and starts.

In my co-pending patent applications entitled "Tape and Film Synchronizing System", filed Oct. 12, 1970, Ser. No. 79,829 and "Tape and Film Synchronizing Apparatus", filed Sept. 29, 1970, Ser. No. 76,437, systems are disclosed wherein a tape upon which sound is being recorded and a film upon which the visual subject matter for the sound is being recorded are run in synchronization.

At present, when it is desired to edit a film and tape in synchronization a means is provided for passing the tape over a playback head and for passing the film in front of a projection lens of some sort. However, no precise economical means have been provided to insure that the sound produced by the tape being passed over the playback head corresponds in time to the subject matter of the film being projected. As a result, exact true editing on a modest financial scale is extremely difficult.

It is readily apparent that is a system could be provided for playing the sound on a tape and projecting the corresponding subject matter on a film in synchronization the system would find widespread use. Additionally, if the system were relatively inexpensive and reliable in operation this would add to its popularity.

SUMMARY OF THE INVENTION

It is, therefore, an object of the present invention to provide an improved system for editing a tape and film in synchronization.

More specifically, it is an object of the present invention to provide an economical system wherein a tape can be edited in conjunction with a film and wherein means is provided for advancing or retarding the playing of certain sections of the tape relative to corresponding sections of the film.

A still further object of the present invention is to provide a tape and film synchronizing system having means for simultaneously moving the tape over a playback head and the film past a projection lens wherein means is provided for adjusting the position of the playback head relative to the position of the tape.

A still further object of the present invention is to provide a system capable of achieving the above and other objects and which is reliable in operation as well as economical in cost.

Briefly, in accordance with the present invention, the foregoing as well as other objects are achieved in a system having a feeding tape sprocket and a takeup tape sprocket. Means is provided for insuring the proper feeding and takeup of the tape by the respective sprockets. The tape feeding sprocket is keyed to a shaft and also keyed thereto is a film feeding sprocket. In a similar fashion, the tape takeup sprocket is keyed to a second shaft and a film takeup sprocket is keyed to the second shaft. Means is provided for rotating the shafts in unison and said means can comprise gears affixed to each shaft with a chain in engagement with each gear.

A playback head is positioned on a housing so that as the tape passes from the feeding sprocket to the takeup sprocket it passes over the playback head. Suitable means are provided for producing the sound recorded on the tape. Means is provided for allowing the playback head to move relative to the housing for a purpose that will soon be apparent.

A drive means is provided for driving the first and second shafts and a projection means is provided for projecting the image on the frames of the film as the film is advanced from the feeding sprocket to the takeup sprocket.

In normal use, the tape and film will each have a starting mark so that they can be placed initially in synchronization with each other. When this has been done, the first and second shafts are rotated in unison with each other with the tape being passed over the playback head and the film through the projection system. As a result, sound is produced concurrently with the projection of a picture from the frames on the film. Usually the sound will be in synchronization with the picture produced by the projection system. If for some reason it is found that this synchronization does not exist, then the playback head is moved relative to the tape until the sound produced by the tape once more is in synchronization with the picture produced by the projection system. The moving of the playback head relative to the tape has the effect of moving the tape relative to the film. This movement is utilized to insure synchronization of the sound produced with the picture shown on the projection system. Such movement can take place throughout the running of the system as required.

Other objects of the invention will be pointed out hereinafter.

The invention accordingly consists in the features of construction, combination of elements and arrangement of parts which will be exemplified in the device hereinafter described and of which the scope of application will be indicated in the appended claims.

DESCRIPTION OF THE PREFERRED EMBODIMENT

Figure 1:
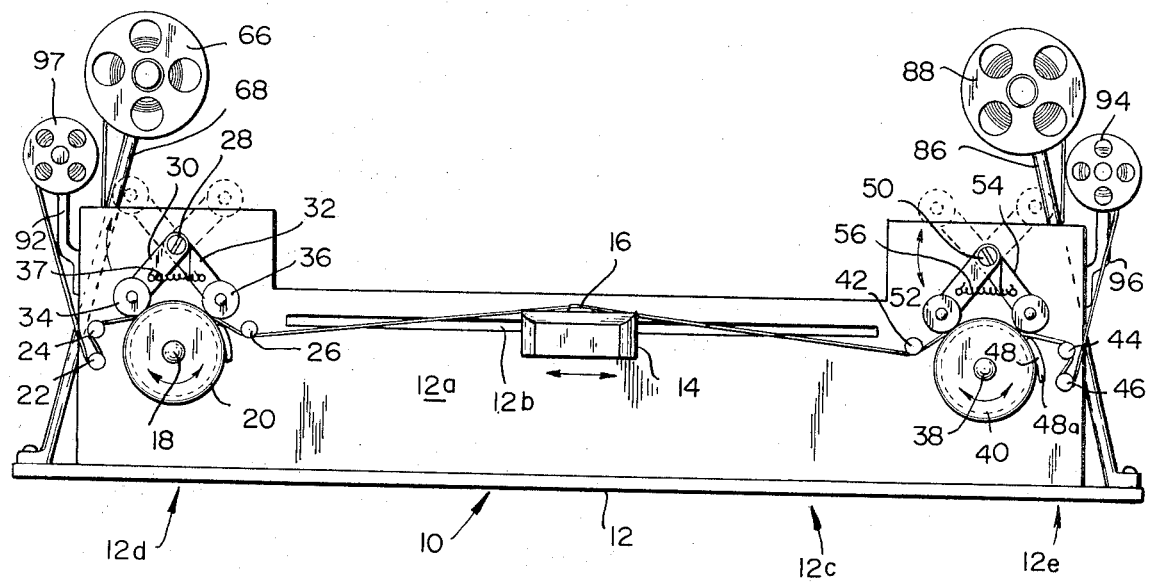
FIG. 1 is a front plan view of an embodiment of the present invention.
Figure 2:
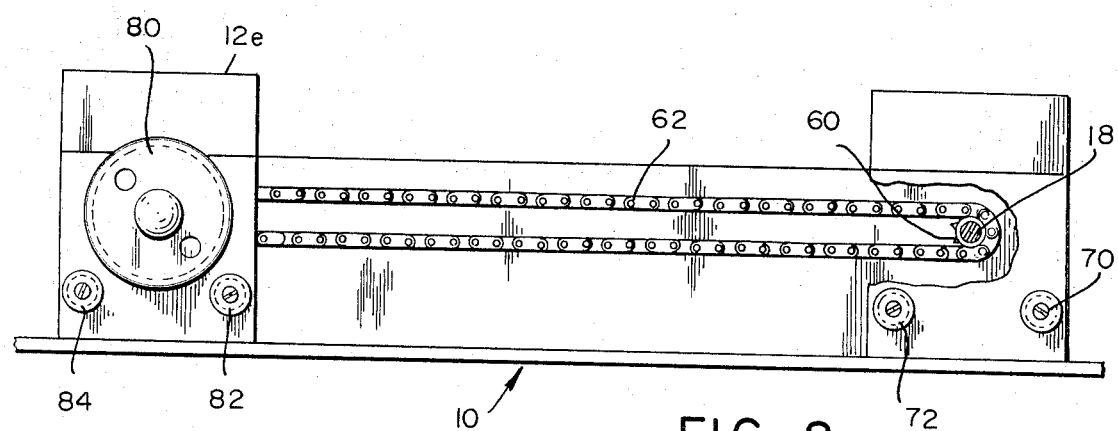
FIG. 2 is a rear plan view of an embodiment of the tape playing apparatus of the present invention.
Figure 6:
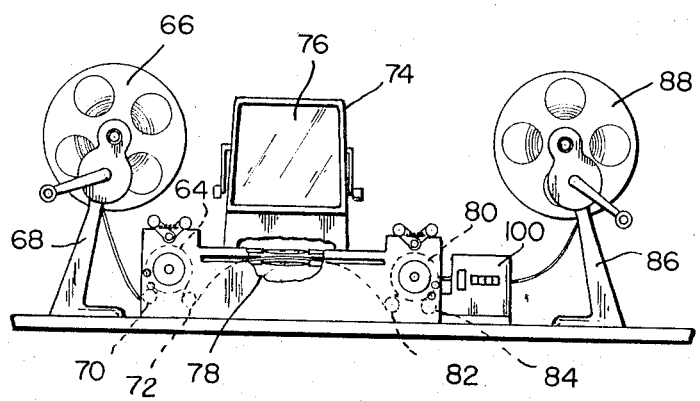
FIG. 6 is a broken front plan view of the film display means of the present invention.

In FIG. 1 of the drawings an embodiment 10 of the present invention is shown and includes a housing 12. Housing 12 includes a front surface 12a having a slot 12b extending along a portion of the length thereof. Preferably slot 12b is horizontal when the housing is positioned in its normal orientation which is shown in FIG. 1. Slideably received in slot 12b is a support member 14 to which is secured a playback head 16. Support member 14 could be any conventional means which can be slideably received within a slot as will be apparent to those skilled in the art. Playback head 16 can be conventional and means is provided which are not shown in the drawings for producing the sound on the tape which is passed over the playback head.

Figure 4:
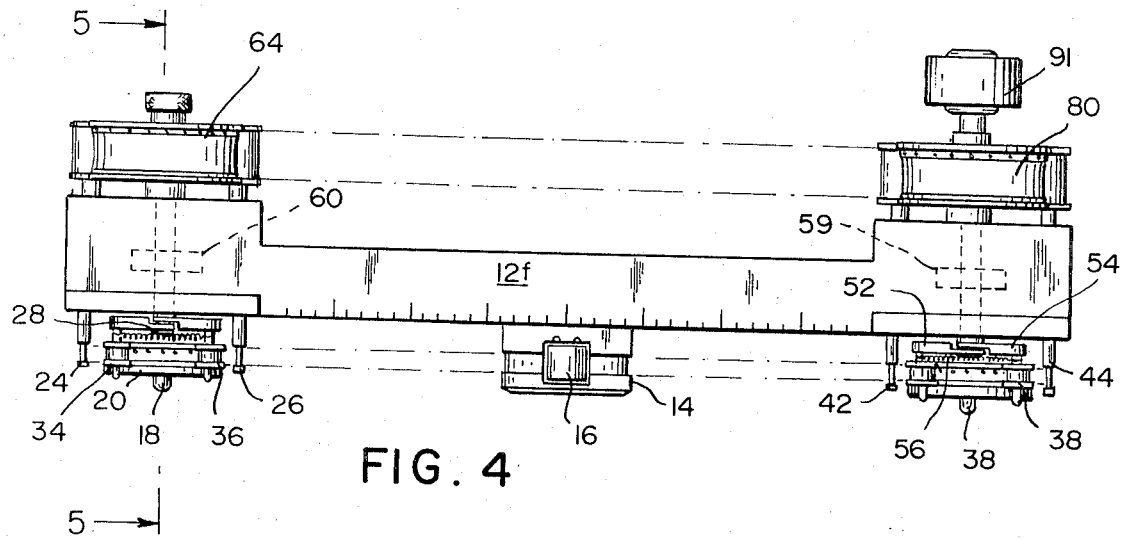
FIG. 4 is a top view of the tape playing apparatus of the present invention.
Figure 5:
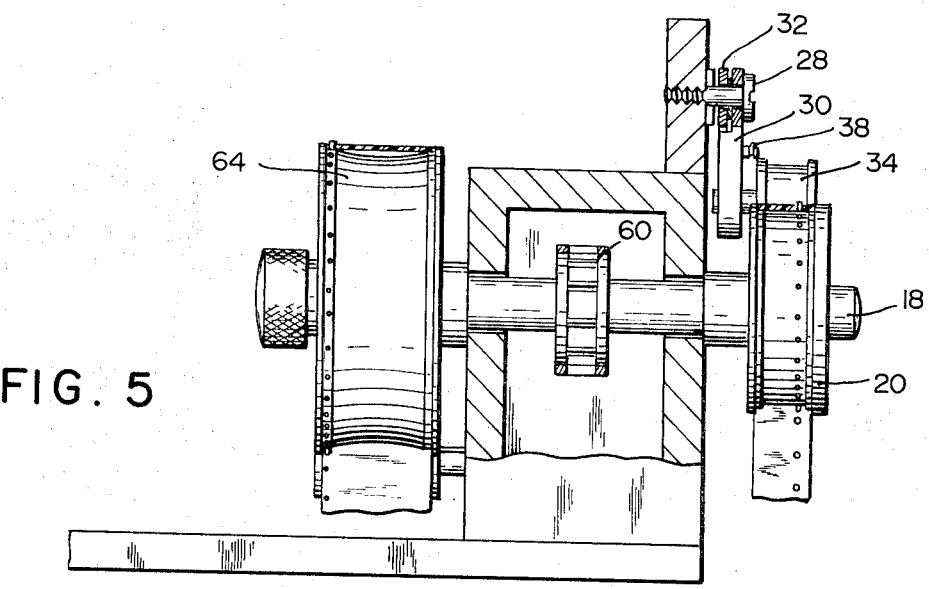
FIG. 5 is a sectional view taken along the line 5—5 of FIG. 1.
Figure 3:
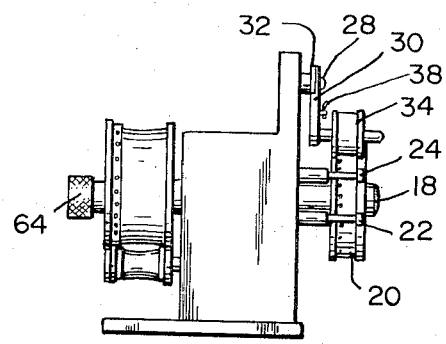
FIG. 3 is a left side view of the tape playing apparatus of the present invention.

As can be seen in FIG. 1, housing 12 includes a central portion 12c which is flanked by raised portions 12d and 12e. Further, as can be seen in FIG. 4 the central portion is narrower than the raised portions with the raised portions both being of the same thickness. The rear of raised portions 12d and 12e include a panel which is parallel to surface 12a. While the back of central portion 12c has been shown open, this is for illustrative purposes only and the back could be opened or closed as desired.

Suitably journalled by the opposed walls of raised portion 12d is a shaft 18 which extends outwardly from said opposed walls. The means for journalling the shaft through the opposed walls of raised portion 12d can be conventional as will be apparent to any skilled mechanic.

Rotatable with shaft 18 and adjacent wall 12a is a tape feeding sprocket 20. The means for securing the sprocket to the shaft can be conventional. Secured to wall 12a and raised portion 12d are guide rollers 22, 24 and 26 with the position of the guide rollers relative to the sprocket being seen in FIG. 1. The guide rollers are freely rotatable and serve a function that will soon be readily apparent. A screw 28 is secured to wall 12a of raised portion 12d above sprocket 20. Pivotally secured to screw 28 are arms 30 and 32. Secured to the free end of the arms are freely rotatable rollers 34 and 36, respectively. A spring 37 biases the arms to the position seen in FIG. 1.

A shaft 38 is journalled by the opposed side walls of raised section 12e and rotatable therewith adjacent the surface of wall 12a is a take-up sprocket 40. Preferably, sprockets 20 and 40 are the same size and shafts 18 and 38 are in a common horizontal plane. Also secured to wall 12a at raised section 12e are guide rollers 42, 44 and 46. The guide rollers, as is conventional, are freely rotatable, and serve a function that will soon be readily apparent.

A pawl 48 is pivotally affixed to wall 12a at raised section 12e and is pivotal about a pivot point 48a passing through its base. As with raised section 12d and sprocket 20 a screw 50 pivotally secures arms 52 and 54 to raised section 12e. Rollers 56 and 58 are secured to the free ends of arms 52 and 54 and are freely rotatable. A spring 56 biases the arms to the position seen in FIG. 1 for a purpose that will soon be readily apparent.

As can be seen in FIG. 4 a gear 59 is rotatable with shaft 38 between the opposed walls which define raised portion 12e. In a similar fashion a gear 60 is rotatable with shaft 18. A link chain 62 is in mesh with gears 59 and 60 to insure synchronized rotation of the gears, shafts 18 and 38 as well as sprockets 20 and 40. It is to be understood that while a link chain 62 has been shown in the drawings that any transmission means for rotating shafts 18 and 38 in unison with each other could be used.

Rotatable with shaft 18 and adjacent the wall at the rear of housing 12 is a film feeding sprocket 64. If desired, a clutch may be provided whereby sprocket 64 can selectively rotate with shaft 18 as desired. Located adjacent sprocket 64 is a film feeding reel 66 which is secured to an arm 68 that is fixed relative to housing 12. Guide rollers 70 and 72 are positioned on the wall at the rear of raised section 12d and are freely rotatable as is conventional.

A film projection system 74 includes a film viewing screen 76 and a projection lens 78. Film projection system 74 can be conventional and a clamping means on housing 12 may be provided for securing the film projection system in its proper orientation, that being adjacent the rear of housing 12. Of course, if desired, the film projection system can be made integral with housing 12, or physically separate therefrom.

Secured to shaft 38 adjacent the rear of housing 12 is a film takeup sprocket 80. A clutch may be provided for allowing shaft 38 to rotate without sprocket 80 rotating. Rollers 82 and 84 are secured to the rear wall of raised section 12e and are freely rotatable. An arm 86 extends from housing 12 and secured to the free end of the arm is a film takeup reel 88. Shaft 38 is rotated by motor 91 which for purposes of illustration is shown adjacent rear of raised section 12e. In actual practice, motor 91 could be located anywhere and could be connected to either shaft since chain 62 insures that the shafts rotate simultaneously.

Located on the top edge 12f (FIG. 4) of central portion 12c of housing 12 are a plurality of markings which consists of lines separated from each other by four dots. The distance between each dot corresponds to the distance between the sprocket holes on the tape which is to be edited.

Sprockets 20 and 40 have teeth thereon which are spaced from each other about the circumference of the sprockets a distance which corresponds to the distance of sprocket holes on the tape. Similarly, sprockets 64 and 80 each have teeth about their peripheries which are spaced apart from each other by a distance which corresponds to the distance between sprocket holes on the film. It is to be noted that the diameters of sprockets 64 and 80 as well as sprockets 20 and 40 are selected so that the rotation of shafts 18 and 38 under the drive of motor 91 results in the proper rate of advancement of the film past the projection lens and the tape past the playback head. A tape feeding reel 97 is provided and is secured to an arm 92 which extends from housing 12. In a similar fashion a tape take-up reel 94 is secured to an arm 96 which extends from raised section 12e of housing 12.

In normal operation the tape to be edited passes from feeding reel 97 about guide rollers 22, 24 and about sprocket 20. The bias of spring 37 maintains rollers 34 and 36 in the position seen in FIG. 1 which insures that the tape will not come loose from sprocket 20. Arms 30 and 32 can be shifted to the position seen in FIG. 1 in dotted lines when threading the tape about sprocket 20. From sprocket 20 the tape passes about guide roller 26 over playback head 16 and about guide roller 42. Rollers 56 and 58 insure that the tape stays threaded about sprocket 40 and pawl 48 prevents the tape from winding about the sprocket 40. The tape then passes about guide rollers 44 and 46 to take-up reel 94. Arms 52 and 54 can be placed in the position shown in dotted lines in FIG. 1 when threading the tape about sprocket 40.

The film passes from feeding reel 66 about guide roller 70, about sprocket 64 and about guide roller 72 to film projection system 74. In film projection system 74 the image on the film is projected by projection lens 78 on to a screen 76. From projection lens 78 the film passes about guide roller 82, sprocket 80, guide roller 84 to take-up reel 88.

With motor 91 running the film is advanced past projection lens 78 with the image thereon projected on screen 76. The tape passes over playback head 16 with the sound recorded thereon played by a suitable amplification system. If it is found that the sound produced from the tape is out of synchronization with the movie produced by the film playback head 16 can be moved in slot 12b until the proper synchronization is obtained. A counter 100 can be activated by either of shafts 18 or 38 and a record may be made of the movement required of head 16 for the different portions of the tape and film to obtain proper synchronization. This record can be used in future playing of the tape and film to control the position of the playback head so that the sound produced by the tape will be in synchronization with the images viewed on the viewer from the film.

If desired a pawl 120 can be used in conjunction with sprocket 20 to prevent tape from winding thereabout.

It thus will be seen that there is provided a device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. In a system for editing, in synchronization, sound on a tape and the corresponding visual subject matter on a film, said tape and said film being separate strips, the system having tape and film feeding and advancing means and a film projection system, the improvement comprising:
   a tape playback head,
   means for feeding the tape over said playback head, said feed means including a rotatable tape feed member and a rotatable tape take-up member,
   said playback head being mounted between said members for movement along the path of the tape being fed over said playback head, and
   enabling means for moving said playback head relative to the tape as the tape is fed over said playback head, the length of tape between said tape feed member and said tape take-up member being independent of the position of said playback head.

2. The improvement of claim 1 further comprising:
   first and second shafts,
   said tape feed rotatable member and film feed rotatable member, both rotatably mounted on said first shaft,
   said tape take-up rotatable member and a film take-up rotatable member, both rotatably mounted on said second shaft,
   said playback head being mounted between said shafts.

* * * * *